(12) United States Patent
Pupius et al.

(10) Patent No.: US 8,396,920 B1
(45) Date of Patent: Mar. 12, 2013

(54) CLEAN URLS IN WEB APPLICATIONS

(75) Inventors: Daniel Felix Pupius, San Francisco, CA (US); Mark David Knichel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/308,033

(22) Filed: Nov. 30, 2011

(51) Int. Cl.
*G06F 15/16* (2006.01)

(52) U.S. Cl. .................. 709/203; 709/217; 715/854

(58) Field of Classification Search .................. None
See application file for complete search history.

(56) References Cited

U.S. PATENT DOCUMENTS

| | | | | |
|---|---|---|---|---|
| 6,549,220 B1 * | 4/2003 | Hsu et al. | | 715/854 |
| 6,763,388 B1 * | 7/2004 | Tsimelzon | | 709/228 |
| 6,792,475 B1 * | 9/2004 | Arcuri et al. | | 709/245 |
| 6,834,306 B1 * | 12/2004 | Tsimelzon | | 709/228 |
| 7,210,094 B2 * | 4/2007 | Dovin et al. | | 715/240 |
| 7,321,918 B2 * | 1/2008 | Burd et al. | | 709/203 |
| 7,617,458 B1 * | 11/2009 | Wassom et al. | | 715/760 |
| 7,698,269 B2 * | 4/2010 | Zhou et al. | | 707/999.006 |
| 7,707,518 B2 * | 4/2010 | Veselova | | 715/841 |
| 7,904,805 B2 * | 3/2011 | Sequeira | | 715/234 |
| 8,131,815 B1 * | 3/2012 | Perelman et al. | | 709/217 |
| 2002/0035629 A1 * | 3/2002 | Sullo et al. | | 709/225 |
| 2002/0194262 A1 * | 12/2002 | Jorgenson | | 709/203 |
| 2007/0061339 A1 * | 3/2007 | Douglet et al. | | 707/10 |
| 2008/0294716 A1 * | 11/2008 | Couvreur | | 709/203 |
| 2010/0017756 A1 * | 1/2010 | Wassom et al. | | 715/854 |
| 2010/0268739 A1 * | 10/2010 | Zalepa | | 707/782 |
| 2010/0281107 A1 * | 11/2010 | Fallows et al. | | 709/203 |
| 2011/0055314 A1 * | 3/2011 | Rosenstein et al. | | 709/203 |
| 2012/0042021 A1 * | 2/2012 | Shah et al. | | 709/206 |

* cited by examiner

*Primary Examiner* — Greg C Bengzon
(74) *Attorney, Agent, or Firm* — Sterne, Kessler, Goldstein & Fox PLLC

(57) ABSTRACT

Disclosed herein are methods and systems for using clean URLs in web applications. A URL having a base path and a subpath is received on a server device from a web browser. The server device sends a rendered webpage and associated JavaScript instructions to the web browser. The JavaScript instructions direct the web browser to determine whether the web browser is compliant based upon whether the web browser supports a URL modification mechanism. If the web browser is noncompliant, the URL is redirected to the base path.

18 Claims, 4 Drawing Sheets

CLEAN URLS IN WEB APPLICATIONS

BACKGROUND

Embodiments relate to the field of web applications.

In recent years, many web applications have shifted from being rendered on a server to being rendered in a web browser. Client-side rendering or rendering in a web browser often provides a more seamless browsing experience because the pages are not seen as refreshing. However, because the rendering occurs in a web browser instead of on a server, the history, or the particular webpages visited by the user in the web application is not natively stored. Many web applications, in order to keep track of history, have appended identifiers which correspond to particular webpages onto the end of a uniform resource locator (URL). However, due to the use of these identifiers, the resulting URLs can be confusing and aesthetically displeasing.

SUMMARY

In general, one aspect of the subject matter described in this specification can be implemented in methods that include the actions of receiving, on a server device, a URL comprising a base path and a subpath from a web browser, sending, from the server device, the rendered webpage to the web browser and associated JavaScript instructions, and directing the web browser, in the JavaScript instructions, to determine whether the web browser is compliant based upon whether the web browser supports a URL modification mechanism, and if the web browser is noncompliant, redirect the URL to the base path.

Other implementations include corresponding systems, apparatus, and computer programs, configured to perform the actions of the methods, encoded on computer storage devices.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
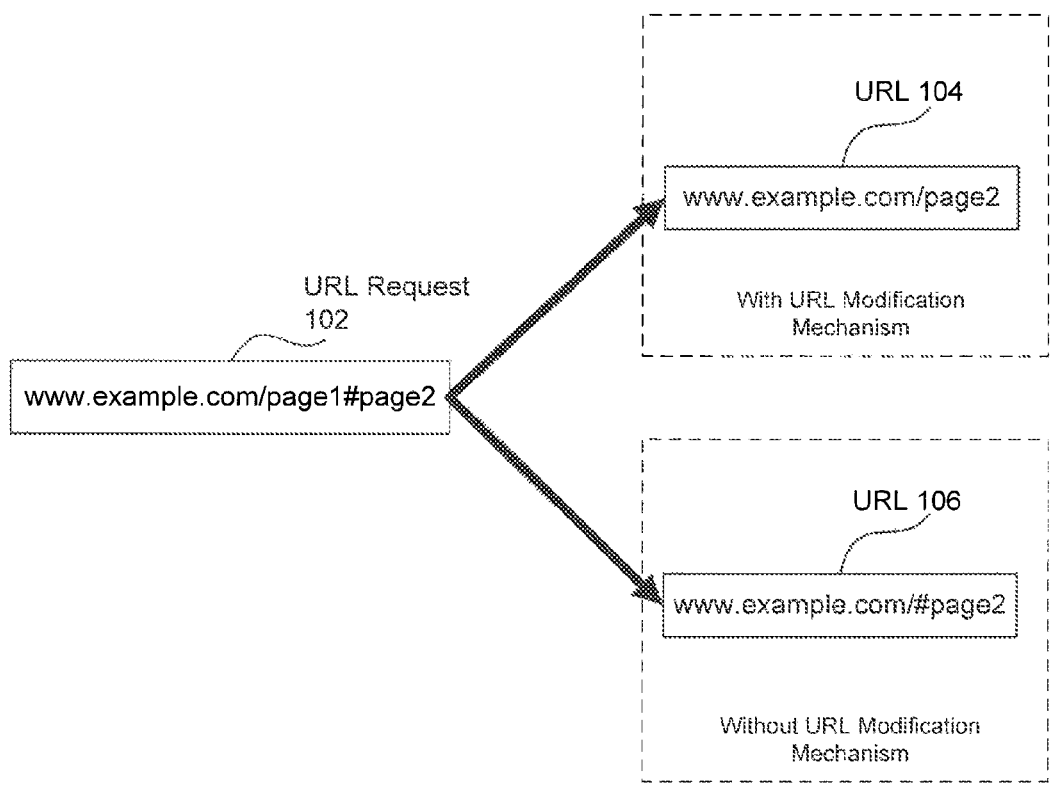
FIG. 1 is a diagram of an example URL being modified to use clean URLs according to an embodiment.

FIG. 1 is a diagram of an example URL being modified to use clean URLs according to an embodiment. FIG. 1 includes a URL request 102. URL request 102 may be a request for a webpage, such as "www.example.com/page1#page2." In particular, URL request 102 may include a fragment identifier from a previous browsing session. For example, URL request 102 may have been bookmarked by a user in a previous browsing using a web browser that does not support a URL modification system. A fragment identifier may be an identifier appended to a URL in order for a client-side rendered web application to keep track of the current page displayed in the web browser. Thus, the fragment identifier may correspond to particular part or web page of a web application. The fragment identifier may be appended to a URL, using a web browser configured with JavaScript instructions received from a server device. Thus, for example, URL request 102 may include a fragment identifier of "#page2," which may represent a request for a corresponding web page to the "#page2" fragment identifier.

In an embodiment, URL request 102 may be modified differently depending on whether URL request 102 was requested from a web browser that supports a URL modification system, for example the HTML5 history application programming interface (API). A URL modification mechanism allows the URL to be modified directly using JavaScript instructions. In web browsers that support URL modification, the URL may be modified using JavaScript instructions to match the current page displayed instead of appending a fragment identifier. The modification may occur without causing the webpage to reload or refresh. Accordingly, when URL request 102 is made in a browser that supports URL modification, URL request 102 may be modified to URL 104 in the web browser using JavaScript. For example, "www.example.com/page1#page2" is modified to "www.example.com/page2." However, in the case of a web browser that does not support a URL modification system, fragment identifiers may still be needed. Thus, when URL request 102 is made in a browser that does not support URL modification, URL request 102 may be modified to URL 106 using redirection. In particular, the web browser may be instructed, using JavaScript instructions, to redirect the URL to the base path, and then append the fragment identifier to the base path. For example, "www.example.com /page1#page2" is modified to "www.example.com/#page2."

Figure 2:
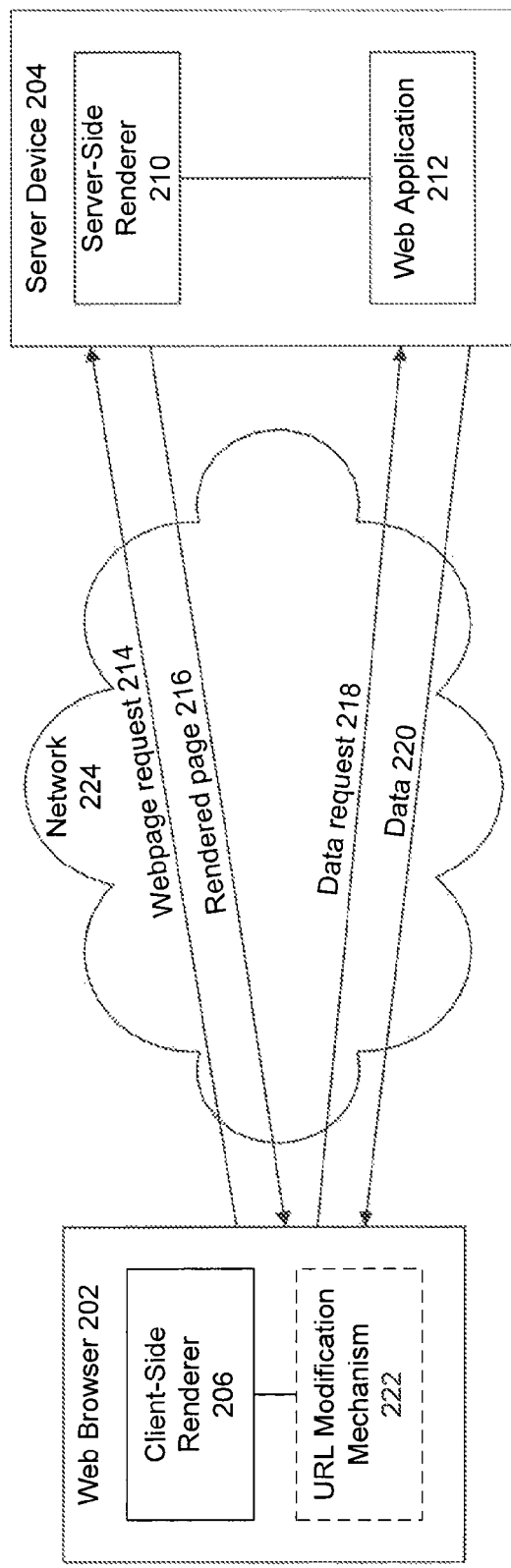
FIG. 2 is a block diagram of an example system for using clean URLs with any type of web browser, according to an embodiment.

FIG. 2 is a block diagram of a system for using clean URLs with any type of web browser. System 200 includes a web browser 202 and a server device 204. Web browser 202 may communicate with server device 204 over a network 224 using web communication protocols. For example, web browser 202 may communicate with server device 204 using hypertext transfer protocol (HTTP). Server device 204 may be any type of computing device and any number of computing devices that alone or in combination implement system 200. For example, server device 204 may be a single web server, or a number of computing devices coupled together to form a cloud architecture for the hosting of web applications. Web browser 202 may be a standalone software application or a part of a software application that displays or uses a web application, website, or webpage. Web browser 202 may also run on any type of computing device, such as a personal computer or mobile phone.

Server device 204 includes a server-side renderer 210. Server-side renderer 210 may be configured to receive a webpage request 214 from web browser 202, render rendered page 216, and then send rendered page 216 to web browser 202. Webpage request 214 may comprise a URL and parameters. The UR may also include an appended fragment identifier in webpage request 214 depending on the type of web application the URL is from. Server-side renderer 210 may render rendered page 216 based on parameters received in webpage request 214, a variety of data sources, such as databases, and logic which runs within server-side renderer 210. The logic may be contained in a web application 212. Rendered page's 216 form may be any combination of HTML, CSS, or JavaScript.

The URL in webpage request 214 may include a base path. The base path may correspond to a particular web application on server device 204, such as web application 212. Accordingly, server device 204 may use the base path to locate and execute web application 212. The base path may be an identifier prefixed by a forward slash. For example, the URL may include a base path of "/app212," which may correspond to web application 212, such that the full URL including the base path may take the form of "www.example.com/app212." However, in some cases, server device 204 may be configured with one web application, and in such cases, the base path may be empty. The URL in webpage request 214 may also include a subpath that may reference particular parts of a web application. Similarly to the base path, the subpath may take the form of an identifier prefixed by a forward slash. For example, in addition to the base path, the URL may include the subpath of "/module1" that may correspond to a particular module within in a web application, such as a list of friends in the case of a social networking web application. Accordingly, in such a case, the full URL may take the form of www.example.com/app312/module1."

Web browser 202 includes a client-side renderer 206. Client-side renderer 206 may be configured by JavaScript instructions received from server device 204. Using these instructions, client-side renderer 206 may render webpages in web browser 202 instead of requesting webpages to be rendered by server device 204 using their basepath and subpath. The JavaScript instructions may be sent within or alongside rendered page 216. The instructions may specify how particular webpages that may be requested from within rendered page 216 may be rendered by client-side renderer 206. If external data is needed to render the particular webpages, the instructions may specify how the external data may be requested. For example, the external data may be requested using asynchronous JavaScript and XML (AJAX). In particular client-side renderer 206 may send a data request 218 to server device 204 and in return receive data 220. Data request 218 and data 220 may be formed using extensible markup language (XML). Data 220 may then be used in the client-side rendering of a requested webpage.

As discussed above, not all web browsers support a URL modification mechanism. However, server device 204 may receive requests for webpages from both browsers that support and do not support a URL modification mechanism. Moreover, if a web browser does not support a URL modification mechanism the web browser may need to append fragment identifiers.

Server-side renderer 202 may also be configured to instruct web browser 202, using JavaScript instructions, to determine if web browser 202 includes an optional URL modification mechanism 222. In particular, web browser 202 may be able to determine whether it supports URL modification mechanism 222, based upon its name and version number. Web browser 202 may also be able to determine whether it is compliant by executing JavaScript instructions. For example, web browser 202 may be able to execute a JavaScript instruction that will query whether web browser 202 supports URL modification system 222. Web browser 202 may also be able to execute JavaScript instructions that test whether web browser 202 has a URL modification mechanism 222. However, a person having skill in the art would recognize that there are other methods that may be used in order to check if web browser 202 includes URL modification mechanism 222.

If web browser 202 includes optional URL modification mechanism 222, then web browser 202 may be considered compliant. Accordingly, after web browser 202 uses client-side renderer 206 to render a webpage, web browser 202 may update the URL using URL modification mechanism 222 to reflect the basepath and subpath of the new webpage rendered instead of appending a fragment identifier. For example, if client-side renderer 206 renders "page2" URL modification mechanism 222 may update the URL to "www.example.com/page2."

Web browser 202 may also be configured through JavaScript instructions received from server device 204 to convert fragment identifiers to subpath identifiers if web browser 202 includes URL modification mechanism 222. In some cases, for example, a user may have a saved a URL with an appended fragment identifier. For example, the user may have saved the URL from a web browser that does not support URL modification mechanism 222. In such cases, web browser 202 may be configured to use URL modification mechanism 222 to modify the URL to remove the fragment identifier and instead include a subpath that corresponds to the fragment identifier. Similar to the fragment identifier, the subpath may also correspond to a particular part of web application 212, such that when received by server device 204, server device 204 may render a particular webpage. For example, if the URL saved is "www.example.com/page1#page2," web browser 202 may convert that URL using URL modification mechanism 222 to "www.example.com/page2."

If web browser 202 does not include optional URL modification mechanism 222, then web browser 202 may be configured, using JavaScript instructions, to redirect to the base path of the URL included in webpage request 214. If web browser 202 does not include URL modification mechanism 222, web browser 202 may be considered noncompliant. Client-side renderer 206 may then render the webpage located at the base path of URL included in webpage request 214. However, web browser 202 may instead make a request to server-side renderer 202 to render the webpage located at the base path of the URL included in webpage request 214. If the URL in webpage request 214 has a fragment identifier appended, client-side renderer 206 may render the corresponding webpage. Additionally, the fragment identifier from the webpage request 214 may be appended to the redirected URL. For example, if the original URL was "www.example.com/page1#page2," the redirected URL may then be "www.example.com/#page2."

Server-side renderer 210 may also be further configured to instruct web browser 202, using JavaScript instructions, to correct any incorrect webpages that may have been rendered because of the use of fragment identifiers. Server-side renderer 210 may send the JavaScript instructions alongside or within rendered webpage 216. Due to limitations in the implementation of HTTP, server device 204 may not be capable of receiving fragment identifiers appended to a URL. As a result, in some cases, an incorrect webpage may be rendered by the server-side renderer 210. For example, a URL request may be made for "www.example.com/page1#page2." In such a case, the server device 204 may not be able to receive the "#page2" fragment identifier and the server-side renderer 210 may render "page1" instead. In such cases, web browser 202 may be directed using JavaScript instructions to decode the fragment identifier appended to the URL to determine the fragment identifier's corresponding webpage. If rendered page 216 is not the fragment identifier's corresponding webpage, then web browser 202 using client-side renderer 206 may render the fragment identifier's corresponding webpage. The JavaScript instructions may further instruct web browser 202 to set the web browser's display to a temporary screen while the web browser is determining if the correct page was rendered. Furthermore, the web browser may maintain this temporary screen, if necessary, until the correct page is rendered. However, if the correct page was initially rendered, the temporary screen may be turned off after it has been determined to be the correct page. The temporary page may be a solid color, such as white, a loading page, or any other placeholder page.

Figure 3:
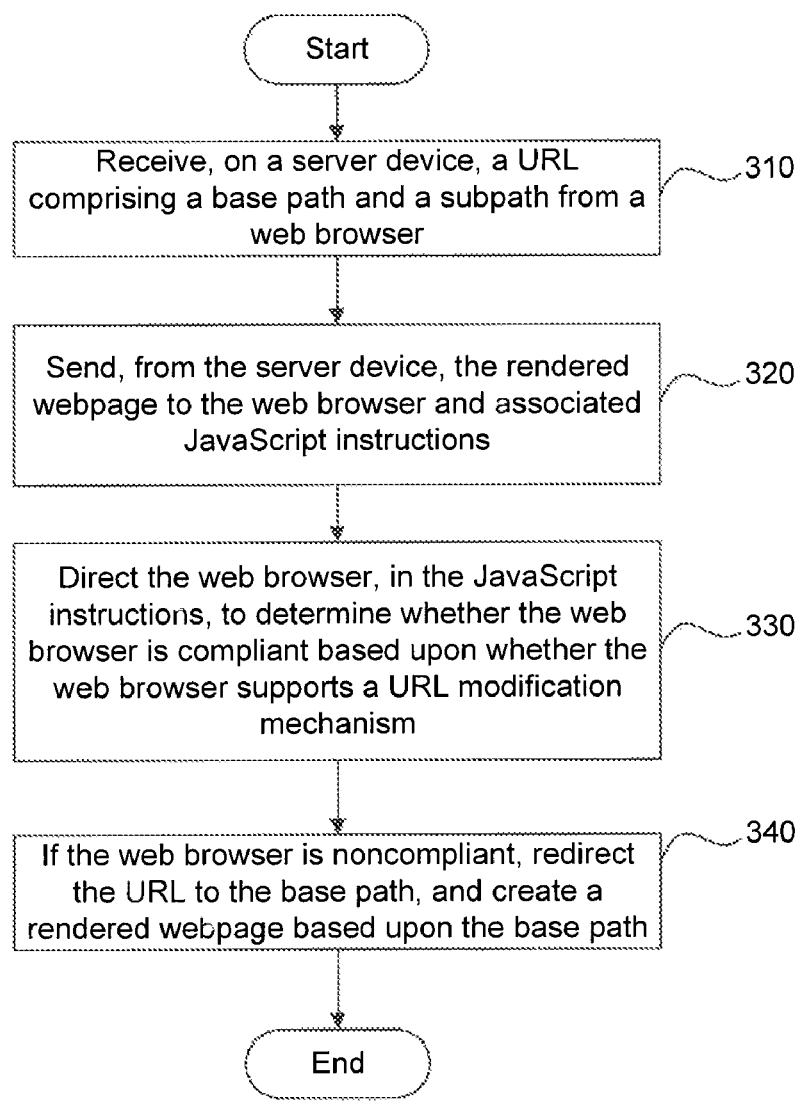
FIG. 3 is a flow diagram of a method for using clean URLs in a web application, according to an embodiment.

FIG. 3 is a flow diagram of a method for using clean URLs in a web application, according to an embodiment.

At block 310, a URL comprising a base path and a subpath is received on a server device from a web browser. The base path may correspond to a particular web application on the server device. Accordingly, the server device may use the base path to locate and execute the corresponding web application. The base path may take the form of an identifier prefixed by a forward slash. However, some server devices may only have one web application, and in such cases, the base path may be empty. Furthermore, the URL may also include a subpath to particular parts of a web application. Similarly to the base path, the subpath may take the form of an identifier prefixed by a forward slash.

The URL may also further include a fragment identifier which was appended by the web browser during a client-side rendering of a webpage. In particular, the identifier may be appended in the URL because a user has saved the URL previously, and may now be trying to reload the particular webpage associated with the URL. For example, the user may have bookmarked the previous client-side rendered webpage with the appended fragment identifier.

At block 320, the rendered webpage and associated JavaScript instructions is sent from the server device to the web browser. The rendered webpage and the JavaScript instructions may be sent over a network using a web communication protocol, for example HTTP. The rendered webpage may then be displayed in the web browser.

Accompanying the rendered page sent to the web browser may be JavaScript instructions that instruct the web browser how to render client-side subsequent page requests. The JavaScript instructions may be transmitted inside the rendered webpage or alongside the rendered webpage. These instructions may also instruct the web browser to append fragment identifiers to each webpage which is displayed in the web browser. However, when a URL with an appended fragment identifier is requested from the server device, in some cases the webpage rendered by the server device may be incorrect. This may be because some webservers may not be able to receive the fragment identifier. In such cases, the web browser may be further instructed using JavaScript instructions to check if the webpage rendered by the server device is the correct webpage according to the fragment identifier. If the fragment identifier corresponds to a different webpage, the web browser may client-side render the correct webpage, by rendering the corresponding webpage to the fragment identifier.

At block 330, the web browser is directed, in the JavaScript instructions, to determine whether the web browser is compliant based upon whether the web browser supports a URL modification mechanism. The URL modification mechanism is a system that some web browsers may support that may allow for the URL to be modified in the web browser. For example, the URL modification mechanism may be the HTML5 history API. If the web browser supports a URL modification mechanism then the web browser is compliant. If the web browser does not support a URL modification mechanism then the web browser is noncompliant. The web browser may be able to determine whether it supports the URL modification mechanism, based upon its name and version number. The web browser may also be able to determine whether it is compliant by executing JavaScript instructions. For example, the web browser may be able to execute a JavaScript instruction that will query whether the web browser supports a URL modification system. The web browser may also be able to execute JavaScript instructions that test whether the web browser has a URL modification mechanism. However, a person having skill in the art would recognize that there are other methods that may be used in order to check if the web browser includes URL modification mechanism.

At block 340, if the web browser is noncompliant, the URL is redirected to the base path and a rendered webpage is created based upon the base path. A redirection may be an action that causes the web browser to request a different webpage. The redirection may occur by executing JavaScript instructions received by the web browser. In particular, web browser may request the webpage associated with the base-path of the URL. This may occur by requesting the new webpage be rendered by the server device. However, the basepath webpage may also rendered client-side. If the URL request has a fragment identifier appended, the corresponding webpage to the fragment identifier may then be rendered client-side. The fragment identifier from the original request may then be appended to the redirected URL. For example, if the original URL was "www.example.com/page1#page2," the redirected URL may then be "www.example.com/#page2."

If the web browser is compliant, the server device may also instruct the web browser using JavaScript instructions to modify the URL of any subsequently client-side rendered webpage to that webpage's corresponding base path and subpath using the URL modification mechanism. However, some URLs may also include fragment identifiers, because they may have been, for example, saved from a previous browsing session. In such cases, where the web browser is compliant, the fragments may be converted to their corresponding base path and subpath. The server device may be configured to send a JavaScript instruction that decodes the fragment identifier and modify the URL such that the base path and subpath correspond to the fragment identifier's corresponding webpage.

Figure 4:
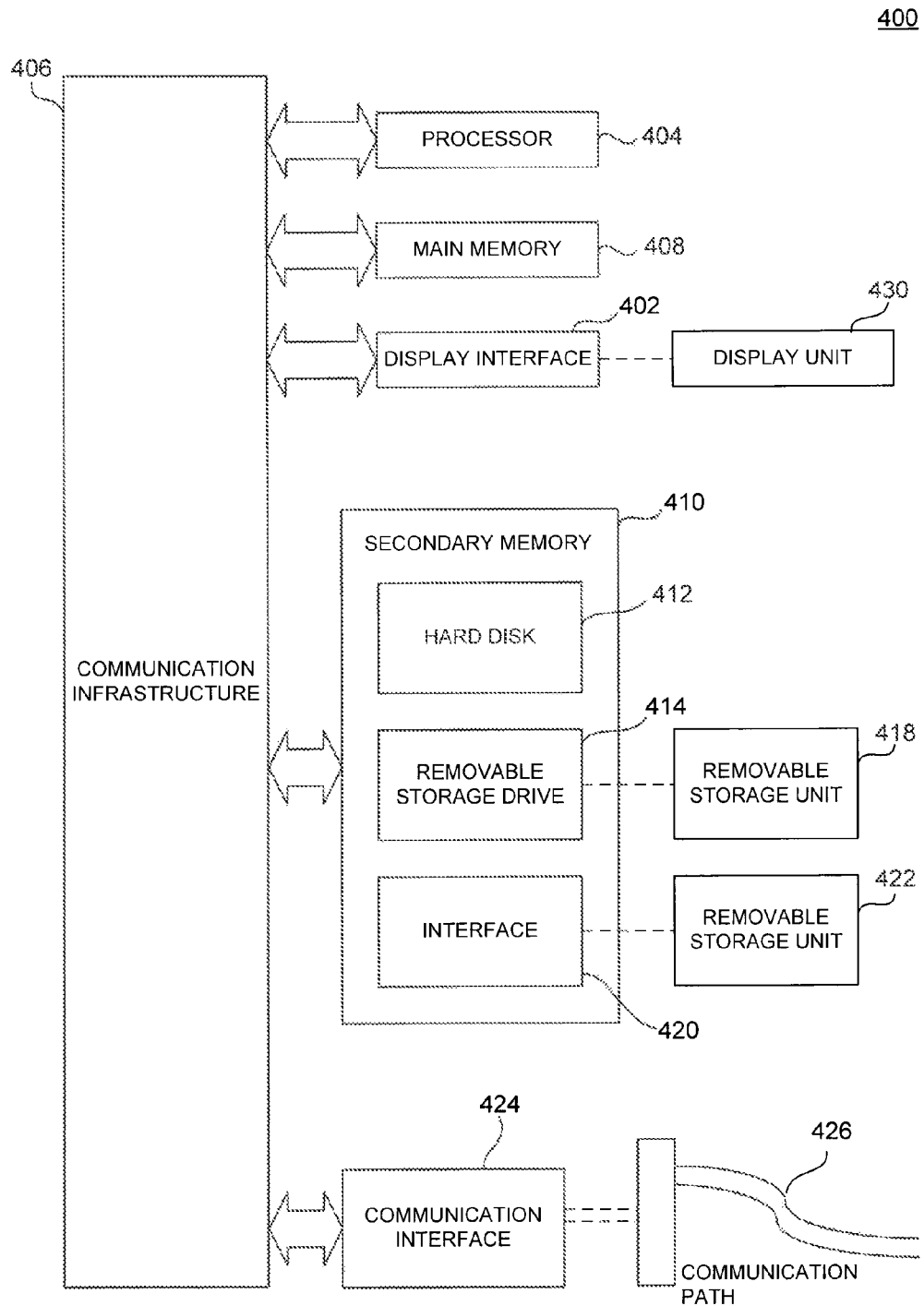
FIG. 4 illustrates an example computer system.

FIG. 4 illustrates an example computer system. For example, system 200, web browser 202, or server device 204, including portions thereof, may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1-3.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 400. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may also be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Secondary memory 410 may include, for example, a hard disk drive 412 and removable storage drive 414. Removable storage drive 414 may include a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored thereon computer software and/or data.

Computer system 400 (optionally) includes a display interface 402 (which can include input and output devices such as keyboards, mice, etc.) that forwards graphics, text, and other data from communication infrastructure 406 (or from a frame buffer not shown) for display on display unit 430.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card.

Some embodiments may be directed to computer products comprising software stored on any computer readable storage medium. Such software, when executed in one or more data processing device, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method, comprising:
   receiving, on a server device, a URL comprising a base path and a subpath from a web browser;
   sending, from the server device, a rendered webpage associated with the URL to the web browser and associated script instructions; and
   directing the web browser, in the script instructions, to:
      determine whether the web browser is compliant based upon whether the web browser supports a URL modification mechanism
      redirect the URL to the base path when the web browser is noncompliant, and modify the subpath in the URL such that the subpath represents the corresponding webpage of a fragment identifier in the URL when the web browser is compliant.

2. The computer-implemented method of claim 1, wherein the script instructions include JavaScript instructions.

3. The computer-implemented method of claim 2, further comprising:
   directing the web browser, in the JavaScript instructions, to append the fragment identifier to the URL if the web browser is noncompliant.

4. The computer-implemented method of claim 2, further comprising:
   directing the web browser in the JavaScript instructions to:

receive the fragment identifier from the URL,
determine the corresponding webpage for the fragment identifier,
detect if the rendered webpage is the corresponding webpage, and
render the corresponding webpage if the rendered webpage is not the corresponding webpage.

5. The computer-implemented method of claim 1, wherein the URL modification mechanism is an HTML5 history application programming interface.

6. The computer-implemented method of claim 1, wherein the web browser supports HTML5.

7. A system comprising:
one or more processors;
a memory; and
a server-side renderer configured to:
receive a URL from a web browser, wherein the URL comprises a base path and a subpath;
render an associated webpage and script instructions to the URL;
send, from the server device, the rendered webpage and the JavaScript instructions to the web browser,
direct the web browser, in the script instructions, to:
determine whether the web browser is compliant based upon whether the web browser supports a URL modification mechanism,
redirect the URL to the base path, when the web browser is noncompliant,
modify the subpath in the URL such that the subpath represents the corresponding webpage of a fragment identifier in the URL if the web browser is compliant.

8. The system of claim 7, wherein the script instructions include JavaScript instructions.

9. The system of claim 8, wherein the server-side renderer is further configured to:
direct the web browser, in the JavaScript instructions, to append the fragment identifier to the URL if the web browser is noncompliant.

10. The system of claim 9, wherein the server-side renderer is further configured to:
direct the web browser in the JavaScript instructions to:
receive the fragment identifier from the URL,
determine the corresponding webpage for the fragment identifier,
detect if the rendered webpage is the corresponding webpage, and
render the corresponding webpage if the rendered webpage is not the corresponding webpage.

11. The system of claim 7, the web browser further comprising:
a URL modification system, wherein the URL modification mechanism is an HTML5 history application programming interface.

12. The system of claim 7, wherein the web browser supports HTML5.

13. A non-transitory computer-readable medium storing software comprising instructions executable by one or more computers which, upon such execution, cause the one or more computers to perform operations comprising:
receiving, on a server device, a URL comprising a base path and a subpath from a web browser;
sending, from the server device, a rendered webpage associated with the URL to the web browser and associated script instructions; and
directing the web browser, in the script instructions, to:
determine whether the web browser is compliant based upon whether the web browser supports a URL modification mechanism
redirect the URL to the base path when the web browser is noncompliant, and modify the subpath in the URL such that the subpath represents the corresponding webpage of a fragment identifier in the URL when the web browser is compliant.

14. A non-transitory computer-readable medium of claim 13, wherein the script instructions include JavaScript instructions.

15. A non-transitory computer-readable medium of claim 14, wherein the operations further comprise:
directing the web browser, in the JavaScript instructions, to append the fragment identifier to the URL if the web browser is noncompliant.

16. A non-transitory computer-readable medium of claim 14, wherein the operations further comprise:
directing the web browser in the JavaScript instructions to:
receive the fragment identifier from the URL,
determine the corresponding webpage for the fragment identifier,
detect if the rendered webpage is the corresponding webpage, and
render the corresponding webpage if the rendered webpage is not the corresponding webpage.

17. A non-transitory computer-readable medium of claim 13, wherein the URL modification mechanism is an HTML5 history application programming interface.

18. A non-transitory computer-readable medium of claim 13, wherein the web browser supports HTML5.

* * * * *